US012681653B1

(12) United States Patent
Rubin et al.

(10) Patent No.: US 12,681,653 B1
(45) Date of Patent: Jul. 14, 2026

(54) DATA UNIT ALLOCATION IN DISTRIBUTED STORAGE SYSTEMS

(71) Applicant: Dell Products L.P., Round Rock, TX (US)

(72) Inventors: Ivan Rubin, Haifa (IL); Adi Bar Shalom, Haifa (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/191,185

(22) Filed: Apr. 28, 2025

(51) Int. Cl.
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC ..... G06F 3/0631; G06F 3/0604; G06F 3/0689
See application file for complete search history.

(56) References Cited

U.S. PATENT DOCUMENTS

| | | | | | |
|---|---|---|---|---|---|
| 10,140,041 | B1 * | 11/2018 | Dong | .................... | G06F 3/0619 |
| 10,146,447 | B1 * | 12/2018 | Dong | .................... | G06F 3/0665 |
| 10,782,894 | B1 * | 9/2020 | Han | ....................... | G06F 3/0689 |
| 2014/0310456 | A1 * | 10/2014 | Chambliss | ............ | G06F 3/0614 |
| | | | | | 711/114 |

| | | | | | |
|---|---|---|---|---|---|
| 2019/0220212 | A1 * | 7/2019 | Xu | .................... | G06F 3/0689 |
| 2019/0220357 | A1 * | 7/2019 | Han | ................... | G06F 11/2094 |
| 2020/0341675 | A1 * | 10/2020 | Zhuo | .................... | G06F 3/0632 |
| 2023/0342041 | A1 * | 10/2023 | Zhuo | .................... | G06F 3/067 |

OTHER PUBLICATIONS

Chen et al.; "A Performance Evaluation of RAID Architectures"; IEEE Transactions on Computers 45, No. 10. Oct. 1996.
High Availability and Data Protection with Dell PowerScale Scale-Out NAS, White Paper, Apr. 2025.
"Dell PowerFlex: Unbounded Software-Defined Infrastructure for the Modern Enterprise," Solution Brief, 2020.
"Dell PowerFlex: The Ultimate Software-Defined Infrastructure," Specification Sheet, 2024.

* cited by examiner

*Primary Examiner* — Tracy A Warren

(74) *Attorney, Agent, or Firm* — Ryan, Mason & Lewis, LLP

(57) ABSTRACT

An apparatus in an illustrative embodiment comprises at least one processing device configured to identify data units stored on storage nodes of a storage system, wherein different subsets of the data units comprise data sub-units stored utilizing different data striping schemes. The at least one processing device is also configured to maintain a data structure characterizing relationships between the storage nodes, the data structure comprising, for a given data unit, edge weights that are proportional to a given number of data sub-units that are part of the given data unit. The at least one processing device is further configured to receive an additional data unit to be stored, to determine, utilizing the data structure, a subset of the storage nodes on which to store data sub-units of the additional data unit, and to store the data sub-units of the additional data unit on the determined subset of the storage nodes.

20 Claims, 8 Drawing Sheets

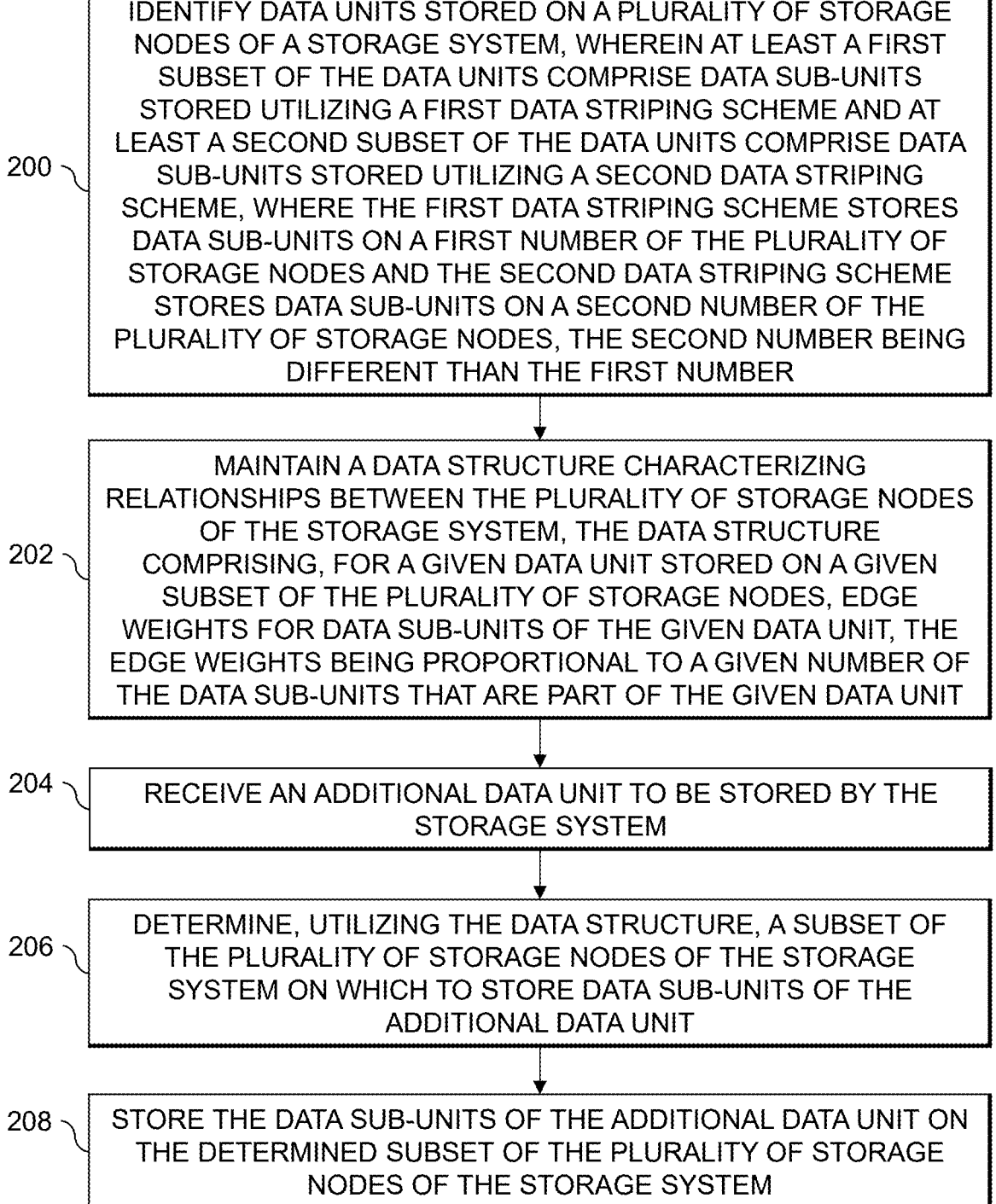

200 — IDENTIFY DATA UNITS STORED ON A PLURALITY OF STORAGE NODES OF A STORAGE SYSTEM, WHEREIN AT LEAST A FIRST SUBSET OF THE DATA UNITS COMPRISE DATA SUB-UNITS STORED UTILIZING A FIRST DATA STRIPING SCHEME AND AT LEAST A SECOND SUBSET OF THE DATA UNITS COMPRISE DATA SUB-UNITS STORED UTILIZING A SECOND DATA STRIPING SCHEME, WHERE THE FIRST DATA STRIPING SCHEME STORES DATA SUB-UNITS ON A FIRST NUMBER OF THE PLURALITY OF STORAGE NODES AND THE SECOND DATA STRIPING SCHEME STORES DATA SUB-UNITS ON A SECOND NUMBER OF THE PLURALITY OF STORAGE NODES, THE SECOND NUMBER BEING DIFFERENT THAN THE FIRST NUMBER

202 — MAINTAIN A DATA STRUCTURE CHARACTERIZING RELATIONSHIPS BETWEEN THE PLURALITY OF STORAGE NODES OF THE STORAGE SYSTEM, THE DATA STRUCTURE COMPRISING, FOR A GIVEN DATA UNIT STORED ON A GIVEN SUBSET OF THE PLURALITY OF STORAGE NODES, EDGE WEIGHTS FOR DATA SUB-UNITS OF THE GIVEN DATA UNIT, THE EDGE WEIGHTS BEING PROPORTIONAL TO A GIVEN NUMBER OF THE DATA SUB-UNITS THAT ARE PART OF THE GIVEN DATA UNIT

204 — RECEIVE AN ADDITIONAL DATA UNIT TO BE STORED BY THE STORAGE SYSTEM

206 — DETERMINE, UTILIZING THE DATA STRUCTURE, A SUBSET OF THE PLURALITY OF STORAGE NODES OF THE STORAGE SYSTEM ON WHICH TO STORE DATA SUB-UNITS OF THE ADDITIONAL DATA UNIT

208 — STORE THE DATA SUB-UNITS OF THE ADDITIONAL DATA UNIT ON THE DETERMINED SUBSET OF THE PLURALITY OF STORAGE NODES OF THE STORAGE SYSTEM

DATA UNITS WITH FEWER EDGES

HEAVIER EDGE WEIGHTS

DATA UNITS WITH MORE EDGES

LIGHTER EDGE WEIGHTS

| UNWEIGHTED NEIGHBORHOOD MATRIX | | | | | |
|---|---|---|---|---|---|
|  | A | B | C | D | E |
| A | - | 2 | 1 | 1 | 1 |
| B |  | - | 2 | 1 | 1 |
| C |  |  | - | 1 | 1 |
| D |  |  |  | - | 1 |
| E |  |  |  |  | - |

| WEIGHTED NEIGHBORHOOD MATRIX | | | | | |
|---|---|---|---|---|---|
| | A | B | C | D | E |
| A | - | 1+1/2 | 1/2 | 1 | 1 |
| B | | - | 1/3+1/2 | 1/3 | 1/3 |
| C | | | - | 1/3 | 1/3 |
| D | | | | - | 1/3 |
| E | | | | | - |

DATA UNIT ALLOCATION IN DISTRIBUTED STORAGE SYSTEMS

BACKGROUND

Information processing systems often include distributed storage systems comprising multiple storage nodes. These distributed storage systems may be dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage object view to allow a given application to store and access data, without the application being aware that the data is being dynamically distributed among different storage nodes.

SUMMARY

Illustrative embodiments disclosed herein provide techniques for data unit allocation among storage nodes of distributed storage systems.

In one embodiment, an apparatus comprises at least one processing device comprising a processor coupled to a memory. The at least one processing device is configured to identify data units stored on a plurality of storage nodes of a storage system, wherein at least a first subset of the data units comprise data sub-units stored utilizing a first data striping scheme and at least a second subset of the data units comprise data sub-units stored utilizing a second data striping scheme, where the first data striping scheme stores data sub-units on a first number of the plurality of storage nodes and the second data striping scheme stores data sub-units on a second number of the plurality of storage nodes, the second number being different than the first number. The at least one processing device is also configured to maintain a data structure characterizing relationships between the plurality of storage nodes of the storage system, the data structure comprising, for a given data unit stored on a given subset of the plurality of storage nodes, edge weights for data sub-units of the given data unit, the edge weights being proportional to a given number of the data sub-units that are part of the given data unit. The at least one processing device is further configured to receive an additional data unit to be stored by the storage system, to determine, utilizing the data structure, a subset of the plurality of storage nodes of the storage system on which to store data sub-units of the additional data unit, and to store the data sub-units of the additional data unit on the determined subset of the plurality of storage nodes of the storage system.

These and other illustrative embodiments include, without limitation, apparatus, systems, methods and processor-readable storage media.

BRIEF DESCRIPTION OF THE DRAWINGS

FIG. 2 is a flow diagram of an example process for data unit allocation among storage nodes of distributed storage systems in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
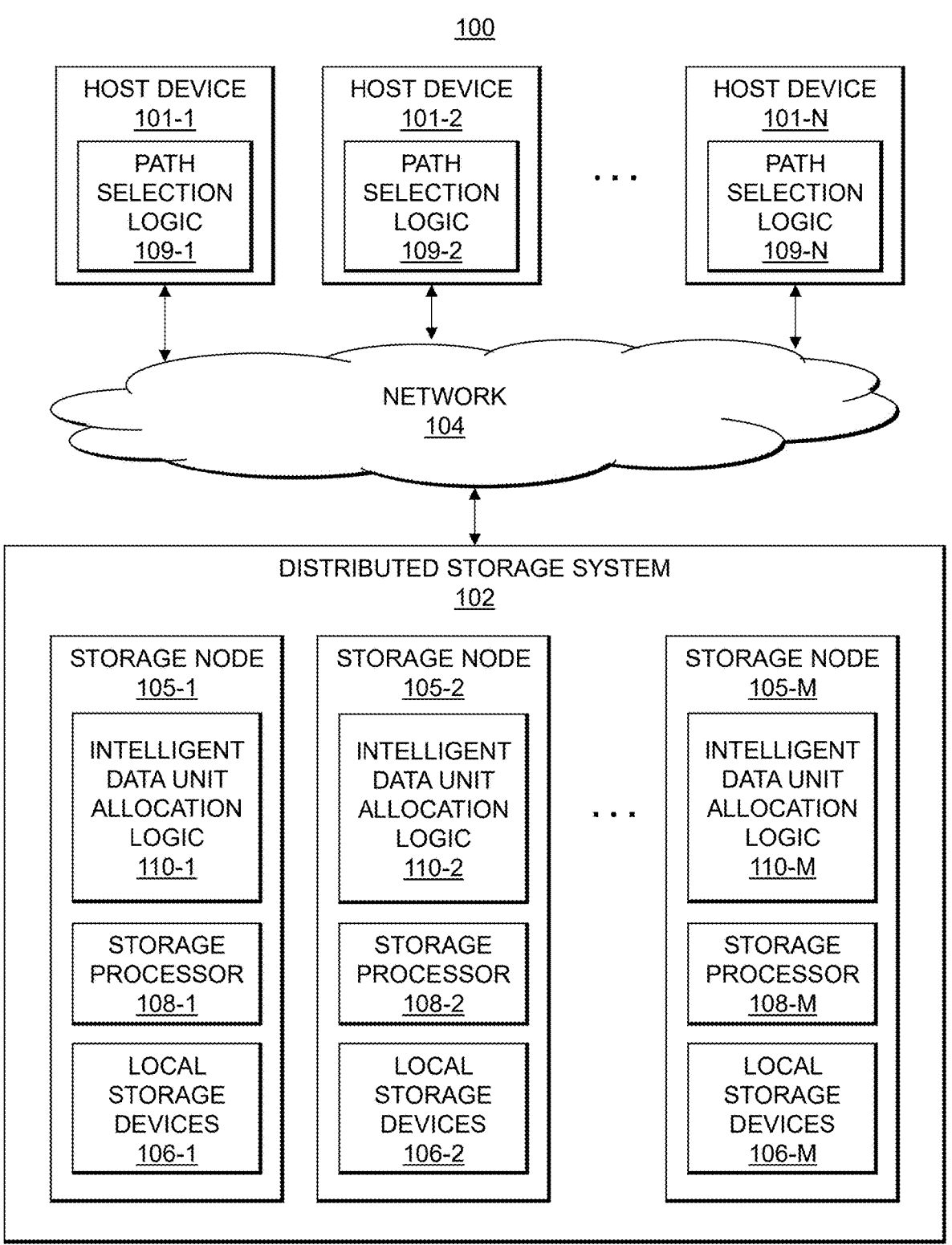
FIG. 1 is a block diagram of an information processing system that includes a distributed storage system configured for intelligent data unit allocation in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical address space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

In some embodiments, SDS server nodes are configured at least in part as respective PowerFlex® software-defined storage nodes from Dell Technologies, suitably modified as disclosed herein to implement intelligent data unit allocation, although other types of storage nodes can be used in other embodiments.

As will be described in more detail elsewhere herein, the storage nodes 105-1, 105-2, . . . 105-M of the distributed storage system 102 each comprise one or more processing devices, with at least one of the processing devices implementing functionality for intelligent data unit allocation utilizing respective instances of intelligent data unit allocation logic 110-1, 110-2, . . . 110-M (collectively, intelligent data unit allocation logic 110). In some embodiments, each of the processing devices comprises one or more multithreaded processing cores, and with at least one of the processing cores implementing at least a portion of the intelligent data unit allocation logic 110.

It is to be appreciated, however, that the functionality for intelligent data unit allocation as disclosed herein can be implemented in other embodiments in stand-alone storage arrays or other types of storage systems that are not distributed across multiple storage nodes, as well as in numerous other multi-threaded systems. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues. In some embodiments, each of the storage nodes 105 comprises one or more non-volatile memory express (NVMe) targets or other types of targets of the distributed storage system 102, and each such target is configured with a plurality of IO queues. Each such IO queue may have a corresponding TCP connection or other type of network connection with one or more of the hosts 101.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards of those devices, that support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE) or RDMA over iWARP.

The first storage node 105-1 comprises a plurality of storage devices 106-1 and an associated storage processor 108-1. The storage devices 106-1 illustratively store metadata pages and user data pages associated with one or more storage volumes of the distributed storage system 102. The storage volumes illustratively comprise respective logical units (LUNs) or other types of logical storage volumes (e.g., NVMe namespaces). The storage devices 106-1 in some embodiments more particularly comprise local persistent storage devices of the first storage node 105-1. Such persistent storage devices are local to the first storage node 105-1, but remote from the second storage node 105-2, the storage node 105-M and any other ones of other storage nodes 105. The first storage node 105-1, utilizing its associated storage processor 108-1, implements intelligent data unit allocation logic 110-1 configured for maintaining a data structure (e.g., a neighborhood matrix) characterizing relationships between the storage nodes 105 of the distributed storage system 102. The data structure may include, for each data unit, edge weights for data sub-units of each data unit, where the edge weights are proportional to the particular number of sub-units which are part of each data unit. The intelligent data unit allocation logic 110-1 utilizes this data structure when performing allocation of new data units, and when performing rebalancing of data units among the storage nodes 105. For example, new data unit allocations may seek to assign data sub-units for new data units in a manner which minimizes the neighborhood matrix in terms of a maximum number of edges between any two of the storage nodes 105, without migrating any of the data units already stored by the distributed storage system 102.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2 implementing intelligent data unit allocation logic 110-2, and storage node 105-M comprises a plurality of storage devices 106-M and an associated storage processor 108-M implementing intelligent data unit allocation logic 110-M.

As indicated previously, the storage devices 106-2 through 106-M illustratively store metadata pages and user data pages associated with one or more storage volumes of the distributed storage system 102, such as the above-noted LUNs or other types of logical storage volumes. The storage devices 106-2 in some embodiments more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M in some embodiments more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include, for example, non-volatile random access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices that may be used to implement at least a portion of the storage devices 106 of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVMe Specification, Revision 2.0c, October 2022, which is incorporated by reference herein. Other examples of NVMe storage access protocols that may be utilized in illustrative embodiments disclosed herein include NVMe over Fabrics, also referred to herein as NVMe-OF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding parity block p. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

The storage processors 108 of the storage nodes 105 implement instances of the intelligent data unit allocation logic 110. The intelligent data unit allocation logic 110 is configured to allocate data sub-units of data units which are stored in the distributed storage system 102 utilizing a data structure (e.g., a neighborhood matrix) with edge weights assigned to the data sub-units in a manner that is proportional to the numbers of the storage nodes 105 on which different ones of the data units are stored (e.g., such that each data unit's edge weights sum to the same value).

The storage processors 108 of the storage nodes 105 may include additional modules, logic and other components typically found in conventional implementations of storage processors and storage systems, although such additional modules, logic and other components are omitted from the figure for clarity and simplicity of illustration.

In some embodiments, the storage nodes 105 of the distributed storage system of FIG. 1 are connected to each other in a full mesh network, and are collectively managed by a system manager. A given set of local persistent storage devices or other storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 of FIG. 1 can include additional components not explicitly shown in the figure, such as one or more system management nodes that are illustratively configured to provide system management functionality of the type noted above. Such functionality may further involve utilization of control plane servers and a system management database. In some embodiments, at least portions of the system management nodes and their associated control plane servers are distributed over the storage nodes 105. For example, a designated subset of the storage nodes 105 can each be configured to include a corresponding one of the control plane servers. Other system management functionality provided by system management nodes can be similarly distributed over a subset of the storage nodes 105.

The system management database stores configuration and operation information of the system 100 and portions thereof are illustratively accessible to various system administrators such as host administrators and storage administrators.

The hosts 101-1, 101-2, . . . 101-N include respective instances of path selection logic 109-1, 109-2, . . . 109-N. In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVMe subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic 109 of the hosts 101 for delivering IO operations from the hosts 101 to the distributed storage system 102 are associated with respective initiator-target pairs.

In some embodiments, IO operations are processed in the hosts 101 utilizing their respective instances of path selection logic 109 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective instances of path selection logic 109, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues and respective multi-path input-output (MPIO) drivers. The MPIO drivers collectively comprise a multi-path layer of hosts 101. Path selection functionality for delivery of IO operations from the hosts 101 to the distributed storage system 102 is provided in the multi-path layer by respective instances of path selection logic implemented within the MPIO drivers. In some embodiments, the instances of path selection logic 109 are implemented at least in part within the MPIO drivers of the hosts 101.

The MPIO drivers may comprise, for example, Power-Path® drivers from Dell Technologies. Other types of MPIO drivers from other driver vendors may additionally or alternatively be used.

For example, the instances of path selection logic 109 of the respective hosts 101 can be implemented at least in part in respective MPIO drivers of those hosts.

The MPIO drivers are illustratively configured to deliver IO operations selected from respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs or other types of logical storage devices.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. Such commands are assumed to have various payload sizes associated therewith, and the payload associated with a given command is referred to herein as its "command payload."

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI blocks or other types of blocks. Other command formats, e.g., Submission Queue Entry (SQE), are utilized in the NVMe context.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage devices 106. The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and ROCE. For example, respective sets of IP links used in data transfer and corresponding messaging could be associated with respective different ones of the routing modules.

The particular features described above in conjunction with FIG. 1 should not be construed as limiting in any way, and a wide variety of other system arrangements can be used to implement efficient timer mechanisms as disclosed herein.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108 and instances of path selection logic 109 can be used in other embodiments.

It should therefore be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

An example process for data unit allocation among storage nodes of a storage system will now be described with respect to the process flow of FIG. 2. This process may be viewed as an example algorithm implemented at least in part by one or more of the storage nodes 105 of the distributed storage system 102. These and other algorithms for data unit allocation among storage nodes of a storage system as disclosed herein can use other types and arrangements of system components in other embodiments.

The process illustrated in FIG. 2 includes steps 200 through 208, and in some embodiments may be performed primarily by at least one of the storage nodes 105 of the distributed storage system 102 utilizing the intelligent data unit allocation logic 110.

In step 200, data units stored on the storage nodes 105 of the distributed storage system 102 are identified. At least a first subset of the data units comprise data sub-units stored utilizing a first data striping scheme and at least a second subset of the data units comprise data sub-units stored utilizing a second data striping scheme, where the first data striping scheme stores data sub-units on a first number of the storage nodes 105 and the second data striping scheme stores data sub-units on a second number of the storage nodes 105, the second number being different than the first number. The first data striping scheme and the second data striping scheme may comprise respective RAID schemes. In some embodiments, the data units stored on the storage nodes 105 of the distributed storage system 102 utilize three or more different data striping schemes (e.g., three or more different RAID schemes) each having different widths corresponding to numbers of the storage nodes 105 on which data sub-units of the data units are stored.

In step 202, a data structure characterizing relationships between the plurality of storage nodes of the storage system is maintained. The data structure comprises, for a given data unit stored on a given subset of the storage nodes 105, edge weights for data sub-units of the given data unit, the edge weights being proportional to a given number of the data sub-units that are part of the given data unit. A sum of edge weights for each of the storage nodes 105 may be substantially the same (e.g., the data units are distributed across the storage nodes 105 of the distributed storage system 102 so as to minimize or reduce differences in the sums of edge weights for the data sub-units which are stored by each of the storage nodes 105). The edge weights for the given data unit may comprise one divided by one less than the given number of the data sub-units that are part of the given data unit (e.g., 1/(number of data sub-units that are part of the given data unit−1). The edge weights for the given data unit may be multiplied by a constant value such that all edge weights are integer values. The constant value may be a multiplication of all data striping scheme widths utilized by the distributed storage system 102 minus one.

In step 204, an additional data unit to be stored on the distributed storage system 102 is received.

In step 206, a subset of the storage nodes 105 of the distributed storage system 102 on which to store data sub-units of the additional data unit are determined utilizing the data structure. Determining the subset of the storage nodes 105 of the distributed storage system 102 on which to store the data sub-units of the additional data unit may be further based at least in part on available storage capacity of the storage nodes 105 and/or balancing total numbers of data sub-units stored on each of the storage nodes 105.

In step 208, the data sub-units of the additional data unit are stored on the determined subset of the storage nodes 105 of the distributed storage system 102.

The data structure may comprise a neighborhood matrix. Determining the subset of the storage nodes 105 of the distributed storage system 102 on which to store the data sub-units of the additional data unit may comprise, without migrating any of the data units already stored in the distributed storage system 102, minimizing the neighborhood matrix in terms of a maximum number of edges between any two of the storage nodes 105.

It should be noted that the term "data structure" as used herein is intended to be broadly construed. A data structure, such as the data structure referred to above, may provide a portion of a larger data structure, or the data structure may be a combination of multiple smaller data structures. The data structure may include tables, vectors, matrices, or various other data structures. It should further be appreciated that "maintaining" or "generating" a data structure may encompass, for example, populating a previously-created data structure.

The FIG. 2 process may further include utilizing the data structure to perform rebalancing of data units across the storage nodes 105 of the distributed storage system 102. The rebalancing may be performed periodically and/or in response to detecting at least a threshold imbalance rate between at least two of the storage nodes 105 of the distributed storage system.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing intelligent data unit allocation functionality. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions for utilizing weighted edges in neighborhood matrixes for improved alignment between capacity balancing and rebuild time in storage systems with mixed RAID width schemes. The technical solutions utilize weights for data unit edges, where the weights are inverse to the number of RAID sub-units, so that each data subunit adds the same edges weight to its storage node. This allows data unit allocation based on the neighborhood matrix to prefer storage nodes with less capacity.

Storage systems, including distributed storage systems, may utilize storage solutions that are based on storing each data unit on a subset of storage nodes of the storage system for redundancy. Various RAID schemes may be used together in the same storage system. For example, some data units may be stored on three storage nodes of a storage system, while other data units are stored on four storage nodes of the storage system and some other data units are stored on ten storage nodes of the storage system. The storage system attempts to minimize both: (1) the used capacity differences between storage nodes, as storage nodes with more data sub-units are subject to more read/write load in good paths; and (2) the maximum relationship between any two storage nodes (e.g., the number of data sub-units belonging to the same data units between any two storage nodes), where the maximum relationships directly relates to the number of data sub-units that are required to be read from one storage node in case of failure of another storage node to restore data protection. Some storage systems use a greedy neighborhood-based choice of storage nodes when allocating new data units, where storage nodes for data sub-units are chosen such that the resulting neighborhood matrix would be minimized in terms of the maximum number of edges between any two storage nodes (e.g., for reducing rebuild time), without moving or migrating already allocated data units. Storage systems may implement periodic rebalancing, migrating slices of data sub-units between storage nodes with more slices to storage nodes with less slices, while maintaining data sub-units of the same data unit on distinct storage nodes.

A technical challenge for storage systems is that the number of data sub-units of different RAID schemes may be very imbalanced between storage nodes, either due to additional requirements for different RAID schemes or due to data sub-unit migrations from previous failures (e.g., some storage nodes may have much more data sub-units of "thin" RAID scheme data units than other storage nodes). When new data units are allocated to storage nodes, the requirements for balancing capacity and minimization of the maximum number of storage node relations may conflict with other. For example, storage nodes that have more data units of relatively "thin" RAID schemes, such as RAID-1 (with 2 or 3 copies as opposed to relatively "thick" RAID schemes such as RAID-6 8+2) will have fewer relationships, even if they have more total data sub-units (e.g., due to other RAID schemes). The slice allocator will prefer such storage nodes. Rebalancing, however, would migrate some of those slices from that storage node later. The technical solutions described herein allow for relaxing neighborhood matrix considerations to achieve data unit allocation that maintains a more balanced system, preventing the need for rebalancing in good path IO.

The technical solutions advantageously do not require separation of neighborhood matrices on a per-RAID scheme basis, while achieving the above-described minimization goals. Instead of just counting relations between storage nodes at the time of data unit allocation, weights are given for edges in reverse to the RAID scheme used by the data units (e.g., each of 2 edges for a storage node containing a data sub-unit with width 3 will have a weight of 1/2, while each of nine edges for a storage node containing a data sub-unit of a data unit with width 10 will have a weight of 1/9). This allows the total weight for each data unit to give an aggregate of 1 to its edges, making the number of edges proportional to the number of data sub-units in the storage nodes. To avoid working with floating point, due to the limited maximum number of edges, all the weights may be multiplied by a constant value (e.g., a multiplication of all the possible RAID scheme widths, minus one).

Figure 3:
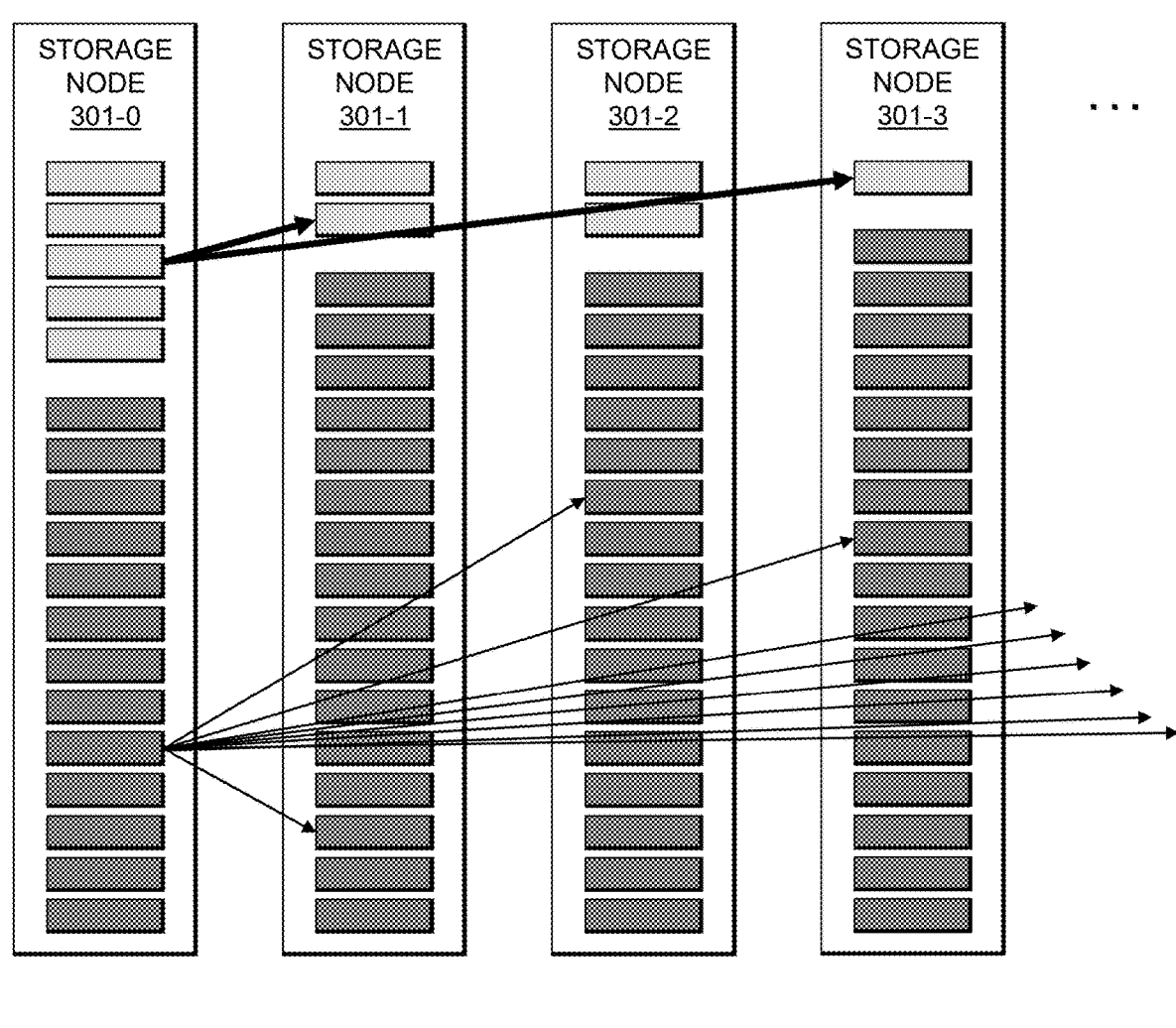
FIG. 3 shows a storage system architecture in which storage nodes store data units of different widths in an illustrative embodiment.

FIG. 3 shows a storage system architecture 300 with storage nodes 301-0, 301-1, 301-2 and 301-3 (collectively, storage nodes 301). Here, each of the storage nodes 301 stores data sub-units for different data units, with some of the data units having fewer edges that are given heaver weights and other of the data units having more edges that are given lighter edge weights.

Figure 4A:
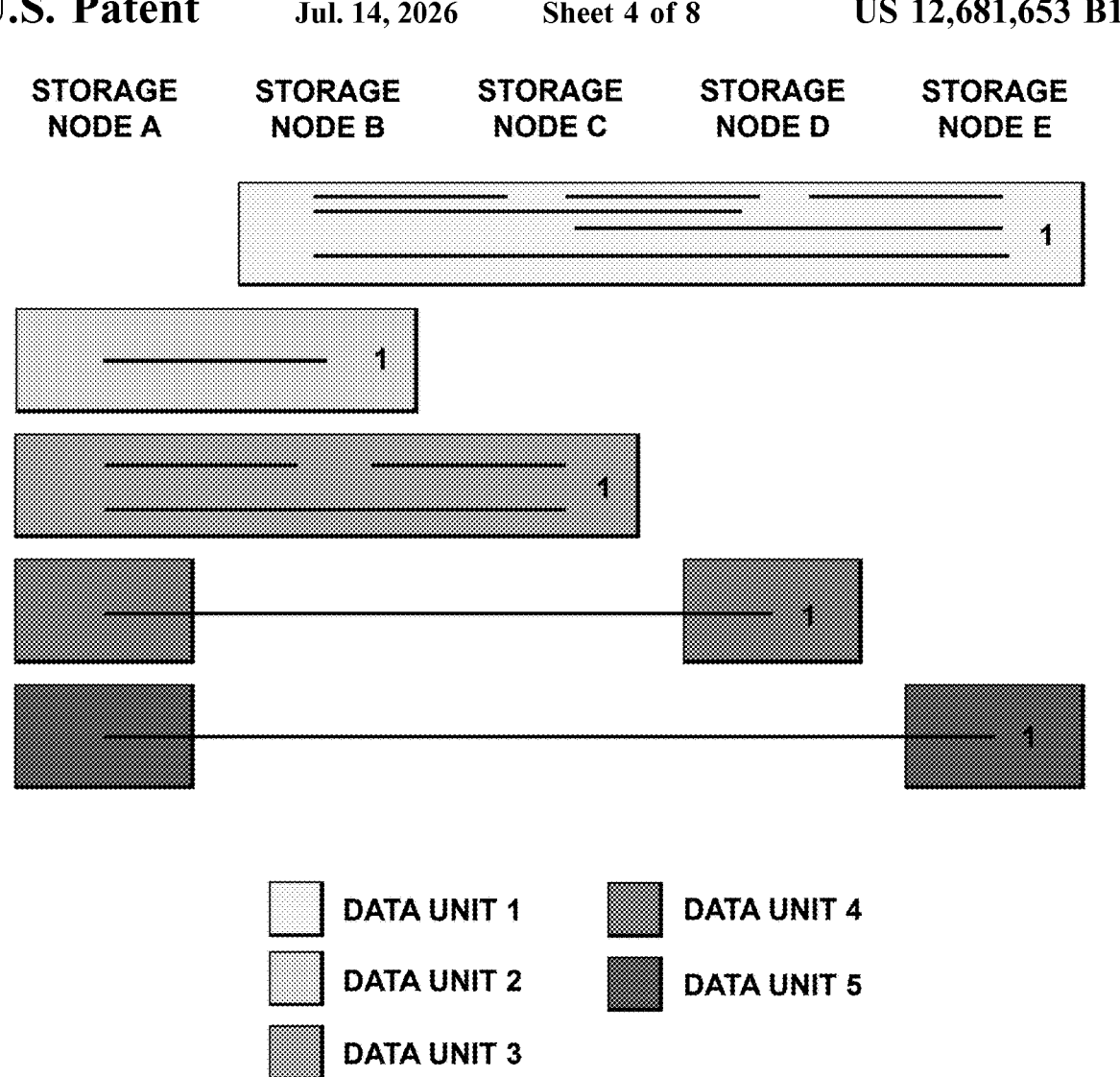
FIGS. 4A-4C show storage system architectures with unweighted, weighted and normalized weighted neighborhood matrices in an illustrative embodiment.
Figure 4B:
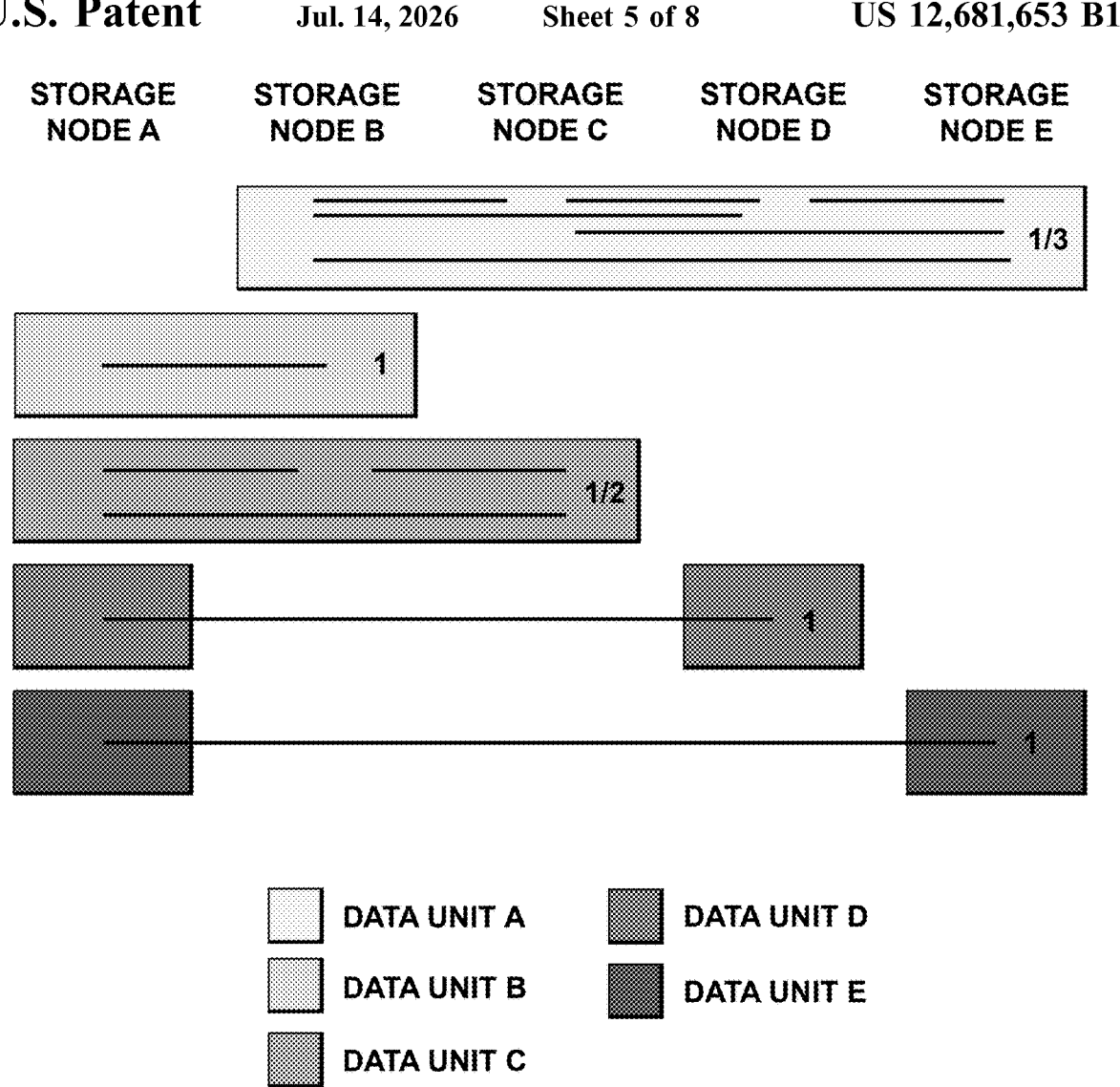
Figure 4C:
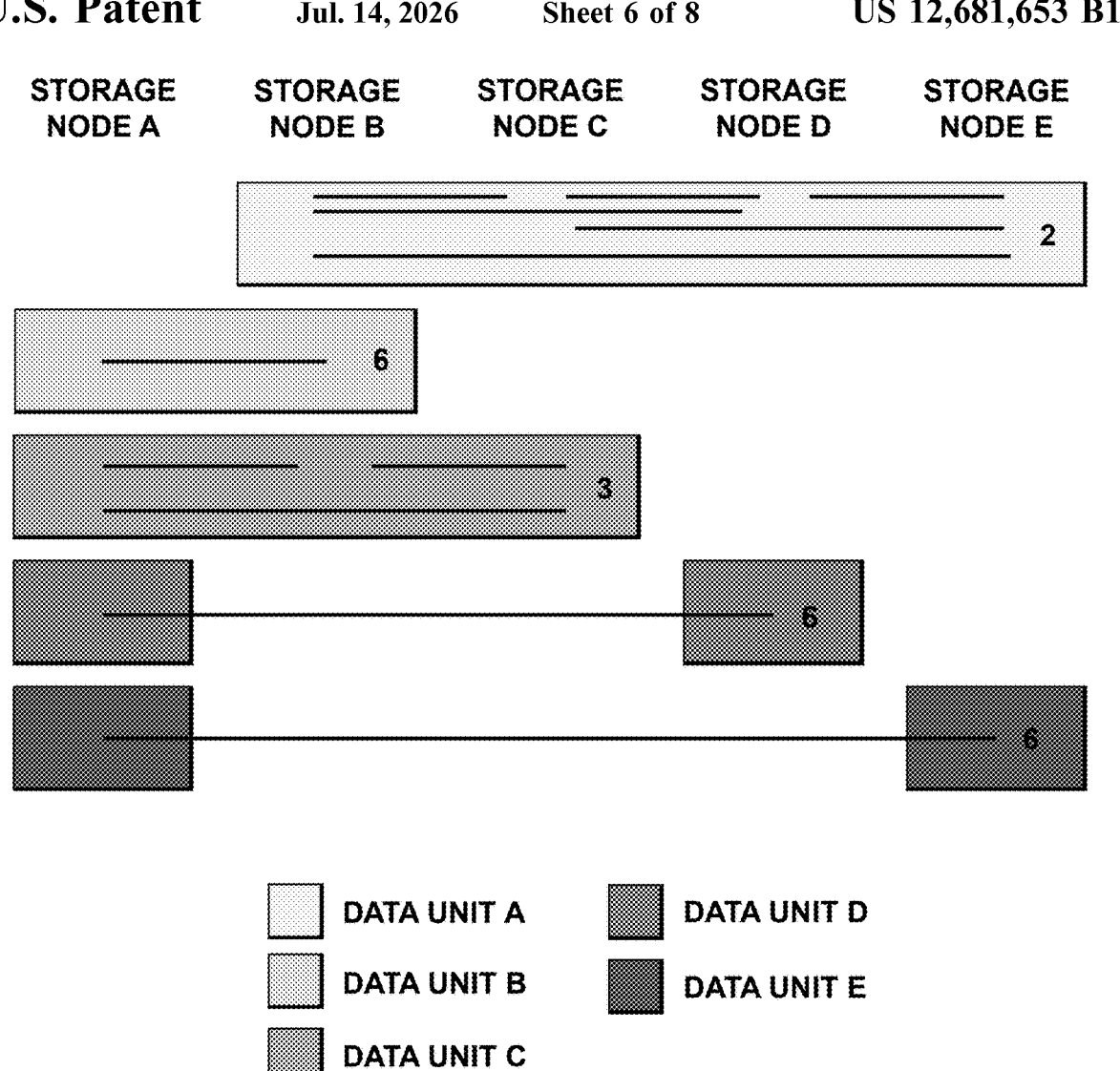

FIGS. 4A-4C show storage system architectures which utilize unweighted and weighted neighborhood matrix solutions. In each of FIGS. 4A-4C, the storage system includes five storage nodes denoted A through E, with five data units spread across the storage nodes A-E. FIG. 4A illustrates the same-weight or unweighted approach, where each data units adds a weightless (e.g., weight=1) edge between each pair of its storage nodes. FIG. 4B illustrates the weighted approach, where different weights are used based on the "width" of each data unit (e.g., the number of the storage nodes A-E on which data sub-units of that data unit are stored). For example, data unit 1 has data sub-units stored on four of the storage nodes (storage nodes A-D), and each of its edges is weighted 1/3. The data unit 3 has data sub-units stored on three of the storage nodes (storage nodes A-C), and each of its edge is weighted 1/2. Data units 2, 4 and 5 have data sub-units which are stored on two of the storage nodes, and thus have edge weights of 1. FIG. 4C illustrates the weighted approach, where the weights are normalized by multiplying each weight by 6 so that all weights are integer units.

Having more edge weights for relatively "thin" RAID scheme data units might give preference to new data unit allocation on storage nodes that are not minimal in terms of its count of neighbors. In the extreme, the maximum number of related data units between two storage nodes might be high, as the relation between the widths of the RAID schemes relative to non-weighted solutions. This may affect rebuild time. The technical solutions describe herein, however, also prefer or provide used capacity balancing, and weighted edges provide that directly. In addition, the rebuild time stays the same under one of the following assumptions: the used allocation is dominated by data units of the same RAID scheme width; and the data sub-units of each RAID scheme width are evenly distributed between storage nodes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for intelligent data unit allocation will now be described in greater detail with reference to FIGS. 5 and 6. Although described in the context of system 100, these platforms may also be used to implement at least portions of other information processing systems in other embodiments.

Figure 5:
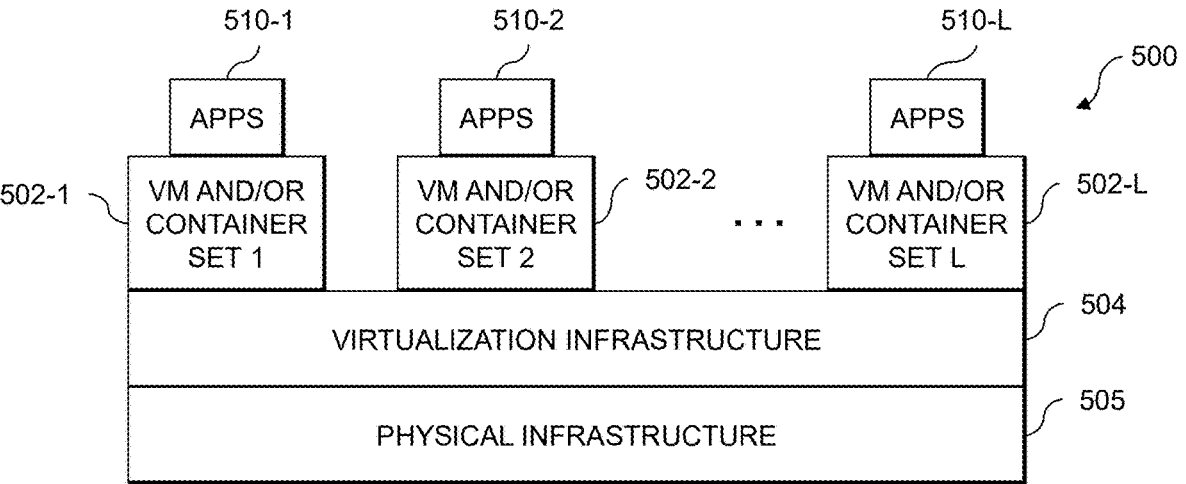
FIGS. 5 and 6 show examples of processing platforms that may be utilized to implement at least a portion of an information processing system in illustrative embodiments.
Figure 6:
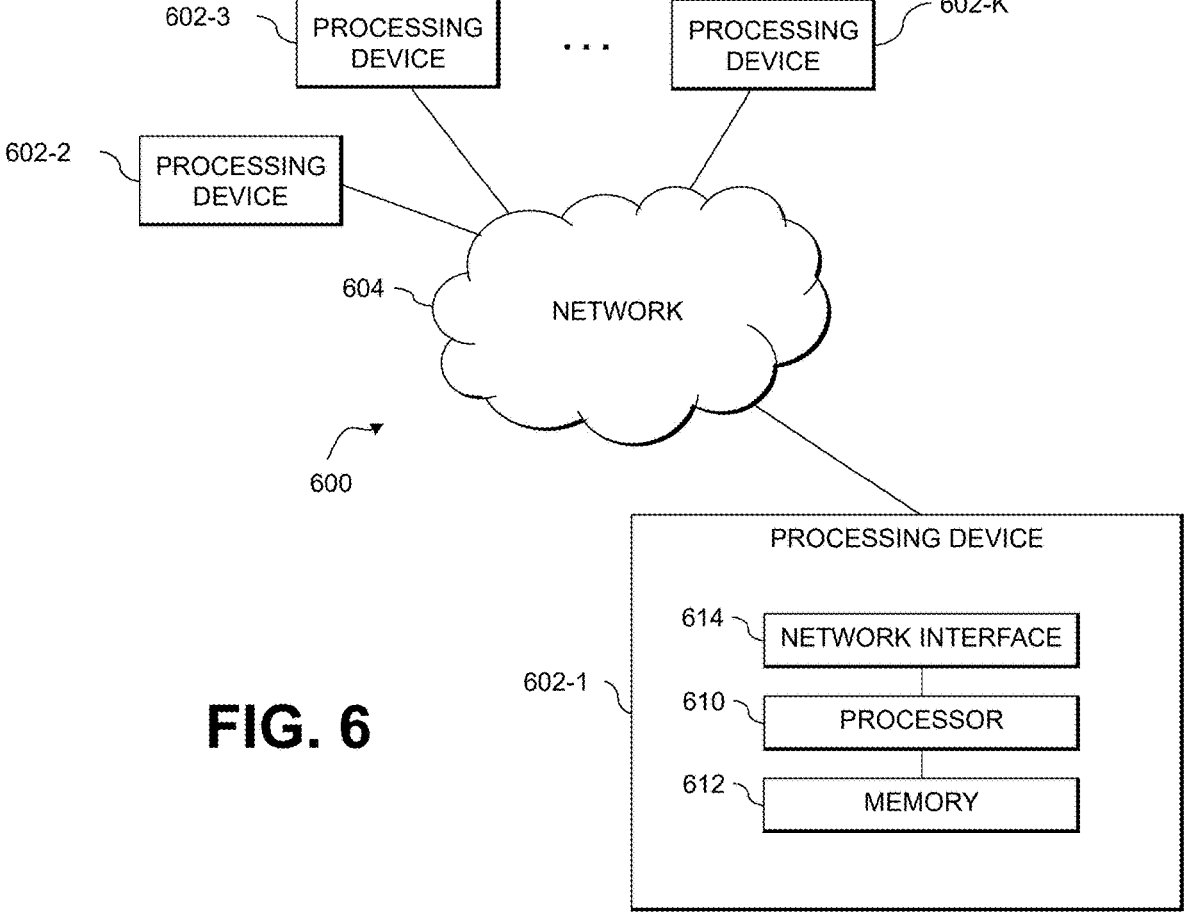

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphics processing unit (GPU), a tensor processing unit (TPU), a video processing unit (VPU), a neural processing unit (NPU), a data processing unit (DPU), a System-On-Chip (SOC) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for intelligent data unit allocation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
    to identify data units stored on a plurality of storage nodes of a storage system, wherein at least a first subset of the data units comprise data sub-units stored utilizing a first data striping scheme and at least a second subset of the data units comprise data sub-units stored utilizing a second data striping scheme, where the first data striping scheme stores data sub-units on a first number of the plurality of storage nodes and the second data striping scheme stores data sub-units on a second number of the plurality of storage nodes, the second number being different than the first number;
    to maintain a data structure characterizing relationships between the plurality of storage nodes of the storage system, the data structure comprising, for a given data unit stored on a given subset of the plurality of storage nodes, edge weights for data sub-units of the given data unit, the edge weights being proportional to a given number of the data sub-units that are part of the given data unit;

to receive an additional data unit to be stored by the storage system;
to determine, utilizing the data structure, a subset of the plurality of storage nodes of the storage system on which to store data sub-units of the additional data unit; and
to store the data sub-units of the additional data unit on the determined subset of the plurality of storage nodes of the storage system.

2. The apparatus of claim 1 wherein the first data striping scheme and the second data striping scheme comprise respective Redundant Array of Independent Disk (RAID) schemes.

3. The apparatus of claim 1 wherein the data units stored on the plurality of storage nodes of the storage system utilize three or more different data striping schemes each having different widths corresponding to numbers of the plurality of storage nodes on which data sub-units of the data units are stored.

4. The apparatus of claim 1 wherein the at least one processing device is configured to distribute the data units among the plurality of storage nodes to such that sums of edge weights for data sub-units stored in each of the plurality of storage nodes is substantially the same.

5. The apparatus of claim 1 wherein the edge weights for the given data unit comprise one divided by one less than the given number of the data sub-units that are part of the given data unit.

6. The apparatus of claim 5 wherein the edge weights for the given data unit are multiplied by a constant value such that all edge weights are integer values.

7. The apparatus of claim 6 wherein the constant value is a multiplication of all data striping scheme widths utilized by the storage system minus one.

8. The apparatus of claim 1 wherein the data structure comprises a neighborhood matrix.

9. The apparatus of claim 8 wherein determining the subset of the plurality of storage nodes of the storage system on which to store the data sub-units of the additional data unit comprises, without migrating any of the data units already stored on the storage system, minimizing the neighborhood matrix in terms of a maximum number of edges between any two of the plurality of storage nodes.

10. The apparatus of claim 1 wherein determining the subset of the plurality of storage nodes of the storage system on which to store the data sub-units of the additional data unit is further based at least in part on available storage capacity of the plurality of storage nodes.

11. The apparatus of claim 1 wherein determining the subset of the plurality of storage nodes of the storage system on which to store the data sub-units of the additional data unit is further based at least in part on balancing total numbers of data sub-units stored on each of the plurality of storage nodes.

12. The apparatus of claim 1 wherein the at least one processing device is further configured to utilize the data structure to perform rebalancing of data units across the plurality of storage nodes of the storage system.

13. The apparatus of claim 12 wherein the rebalancing is performed periodically.

14. The apparatus of claim 12 wherein the rebalancing is performed in response to detecting at least a threshold imbalance rate between at least two of the plurality of storage nodes of the storage system.

15. A computer program product comprising a non-transitory processor-readable storage medium having stored therein program code of one or more software programs, wherein the program code when executed by at least one processing device comprising a processor coupled to a memory, causes the at least one processing device:

to identify data units stored on a plurality of storage nodes of a storage system, wherein at least a first subset of the data units comprise data sub-units stored utilizing a first data striping scheme and at least a second subset of the data units comprise data sub-units stored utilizing a second data striping scheme, where the first data striping scheme stores data sub-units on a first number of the plurality of storage nodes and the second data striping scheme stores data sub-units on a second number of the plurality of storage nodes, the second number being different than the first number;

to maintain a data structure characterizing relationships between the plurality of storage nodes of the storage system, the data structure comprising, for a given data unit stored on a given subset of the plurality of storage nodes, edge weights for data sub-units of the given data unit, the edge weights being proportional to a given number of the data sub-units that are part of the given data unit;

to receive an additional data unit to be stored by the storage system;

to determine, utilizing the data structure, a subset of the plurality of storage nodes of the storage system on which to store data sub-units of the additional data unit; and to store the data sub-units of the additional data unit on the determined subset of the plurality of storage nodes of the storage system.

16. The computer program product of claim 15 wherein the data structure comprises a neighborhood matrix.

17. The computer program product of claim 16 wherein determining the subset of the plurality of storage nodes of the storage system on which to store the data sub-units of the additional data unit comprises, without migrating any of the data units already stored on the storage system, minimizing the neighborhood matrix in terms of a maximum number of edges between any two of the plurality of storage nodes.

18. A method comprising:

identifying data units stored on a plurality of storage nodes of a storage system, wherein at least a first subset of the data units comprise data sub-units stored utilizing a first data striping scheme and at least a second subset of the data units comprise data sub-units stored utilizing a second data striping scheme, where the first data striping scheme stores data sub-units on a first number of the plurality of storage nodes and the second data striping scheme stores data sub-units on a second number of the plurality of storage nodes, the second number being different than the first number;

maintaining a data structure characterizing relationships between the plurality of storage nodes of the storage system, the data structure comprising, for a given data unit stored on a given subset of the plurality of storage nodes, edge weights for data sub-units of the given data unit, the edge weights being proportional to a given number of the data sub-units that are part of the given data unit;

receiving an additional data unit to be stored by the storage system;

determining, utilizing the data structure, a subset of the plurality of storage nodes of the storage system on which to store data sub-units of the additional data unit; and storing the data sub-units of the additional data unit on the determined subset of the plurality of storage nodes of the storage system;

wherein the method is performed by at least one processing device comprising a processor coupled to a memory.

19. The method of claim 18 wherein the data structure comprises a neighborhood matrix.

20. The method of claim 19 wherein determining the subset of the plurality of storage nodes of the storage system on which to store the data sub-units of the additional data unit comprises, without migrating any of the data units already stored on the storage system, minimizing the neighborhood matrix in terms of a maximum number of edges between any two of the plurality of storage nodes.

* * * * *